US012485061B2

(12) United States Patent
Yan et al.

(10) Patent No.: US 12,485,061 B2
(45) **Date of Patent: *Dec. 2, 2025**

(54) MASSAGE DEVICE

(71) Applicants: Dongguan Qunan Technology Co., Ltd., Guangdong (CN); Shenzhen Zhonghongtian Technology Co., Ltd., Guangdong (CN)

(72) Inventors: Bo Yan, Guangdong (CN); Hong Zhang, Guangdong (CN)

(73) Assignees: Dongguan Qunan Technology Co., Ltd., Dongguan (CN); Shenzhen Zhonghongtian Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/032,395

(22) Filed: Jan. 20, 2025

(65) Prior Publication Data

US 2025/0248886 A1 Aug. 7, 2025

Related U.S. Application Data

(63) Continuation of application No. 18/664,306, filed on May 15, 2024, now Pat. No. 12,201,574, which is a (Continued)

(51) Int. Cl.

*A61H 19/00* (2006.01)
*A61H 7/00* (2006.01)

(Continued)

(52) U.S. Cl.

CPC ............. *A61H 19/44* (2013.01); *A61H 7/005* (2013.01); *A61H 11/00* (2013.01); *A61H 19/30* (2013.01);

(Continued)

(58) Field of Classification Search

CPC ........ A61H 19/44; A61H 19/00; A61H 19/30; A61H 19/32; A61H 19/34; A61H 19/40;

(Continued)

(56) References Cited

U.S. PATENT DOCUMENTS

| | | | | | |
|---|---|---|---|---|---|
| 2,247,440 | A * | 7/1941 | Martin | A61H 7/005 | 180/19.1 |
| 3,884,224 | A * | 5/1975 | Garcia | A61H 7/005 | 601/144 |

(Continued)

FOREIGN PATENT DOCUMENTS

| | | |
|---|---|---|
| CN | 1160343 A | 9/1997 |
| CN | 201061607 Y | 5/2008 |

(Continued)

OTHER PUBLICATIONS

English translation for CN 102846460, machine translated by espacenet.com, translated on Jun. 13, 2025.*

(Continued)

*Primary Examiner* — Tu A Vo

(57) ABSTRACT

A massage device includes a shell defining a chamber and a moving space therein, a driving assembly supported by the shell, and a massage member. The moving space communicates with an external environment out of the shell. The driving assembly includes a driving wheel and a driven wheel cooperating with the driving wheel, one of the driving wheel and driven wheel is accommodated inside the chamber and another one of the driving wheel and driven wheel is accommodated inside the moving space. The massage member is mounted around the driving wheel and driven wheel, wherein the massage member partly extends into the moving space and partly surrounds an outer surface of the shell adjacent to the moving space.

16 Claims, 11 Drawing Sheets

Related U.S. Application Data continuation-in-part of application No. 18/635,094, filed on Apr. 15, 2024, now Pat. No. 12,201,572, which is a continuation of application No. 18/372,701, filed on Sep. 26, 2023, now Pat. No. 11,957,634, which is a continuation of application No. 18/118,749, filed on Mar. 8, 2023, now Pat. No. 11,771,619.

(51) Int. Cl.
*A61H 11/00* (2006.01)
*A61H 23/02* (2006.01)

(52) U.S. Cl.
CPC . *A61H 23/0254* (2013.01); *A61H 2201/1215* (2013.01); *A61H 2201/1676* (2013.01)

(58) Field of Classification Search
CPC ........ A61H 7/005; A61H 11/00; A61H 21/00; A61H 15/0085; A61H 23/0254; A61H 11/02
See application file for complete search history.

(56) References Cited

U.S. PATENT DOCUMENTS

| | | | | | |
|---|---|---|---|---|---|
| 5,081,986 | A * | 1/1992 | In | A61H 7/006 | 601/144 |
| 6,551,262 | B1 * | 4/2003 | Lechtman | A61B 17/54 | 601/143 |
| 11,771,619 | B1 | 10/2023 | Yan | | |
| 12,201,574 | B2 * | 1/2025 | Yan | A61H 19/44 | |
| 2010/0160840 | A1 * | 6/2010 | Murphy | A61H 7/005 | 601/112 |
| 2011/0133910 | A1 * | 6/2011 | Alarcon | G06F 3/016 | 340/407.1 |
| 2013/0157811 | A1 * | 6/2013 | Shabodyash | A63B 22/0285 | 482/51 |
| 2014/0018612 | A1 * | 1/2014 | Lin | A61H 19/40 | 600/38 |
| 2014/0243591 | A1 | 8/2014 | Weller | | |
| 2015/0335520 | A1 * | 11/2015 | Dills | A61H 19/30 | 601/46 |
| 2016/0120737 | A1 * | 5/2016 | Sedic | A61H 23/0263 | 601/46 |
| 2017/0367925 | A1 * | 12/2017 | Allen | A61H 19/34 | |
| 2021/0338523 | A1 * | 11/2021 | Zheng | A61H 19/44 | |
| 2024/0108538 | A1 * | 4/2024 | Chen | A61H 23/0254 | |

FOREIGN PATENT DOCUMENTS

| | | | | | |
|---|---|---|---|---|---|
| CN | 102846460 | A | * | 1/2013 | |
| CN | 203493906 | U | * | 3/2014 | A61H 35/00 |
| CN | 103356370 | B | | 12/2014 | |
| CN | 204319236 | U | * | 5/2015 | |
| CN | 106102686 | B | | 4/2018 | |
| CN | 109549832 | A | * | 4/2019 | A61H 23/02 |
| CN | 217409236 | U | | 9/2022 | |
| CN | 115737405 | B | | 6/2024 | |
| EM | 015002671-0001 | A | | 11/2022 | |
| JP | 2006110289 | A | | 4/2006 | |
| JP | 2008188401 | A | | 8/2008 | |
| KR | 1020110100506 | A | | 9/2011 | |
| KR | 101415661 | B1 | * | 7/2014 | A61H 15/0078 |
| WO | WO-0135895 | A1 | * | 5/2001 | A61H 19/34 |
| WO | WO-2014180166 | A1 | * | 11/2014 | A61H 35/00 |

OTHER PUBLICATIONS

English translation for CN 203493906, machine translated by espacenet.com, translated on Jun. 14, 2025.*
Office Action Dated Feb. 12, 2025 for corresponding Japan Application No. 2025-001981.
Office Action Dated May 7, 2025 for Corresponding European Patent Application No. 24222741.1.
Notice of Refusal Dated May 7, 2025 for Corresponding Japanese Patent Application No. 2025-001981.
Notice of Acceptance of Invalidation Request Dated May 7, 2025 for Corresponding Chinese Patent Application No. 202320148777.7.

* cited by examiner

MASSAGE DEVICE

CROSS-REFERENCE TO RELATED APPLICATIONS

This application is a continuation application of application Ser. No. 18/664,306, filed on May 15, 2024, which is a continuation in part application of application Ser. No. 18/635,094, filed on Apr. 15, 2024, which is a continuation application of application Ser. No. 18/372,701, filed on Sep. 26, 2023, and now patented as 11,957,634 on Apr. 16, 2024, which is a continuation application of application Ser. No. 18/118,749, filed on Mar. 8, 2023 and now patented as U.S. Pat. No. 11,771,619 on Oct. 3, 2023, the entire contents of which are hereby incorporated by reference.

TECHNICAL FIELD

The present application relates to the technical field of sex toys, and in particular to a massage device.

BACKGROUND

With the improvement of the human living, in addition to material aspects, more spiritual needs are being pursued. Sexual life has gained more and more attention as a spice of human life, and varied sex toys are developed to add pleasures to sexual life, which satisfy human physiological and psychological needs to a certain extent.

Generally, a sex toy includes a massage head and a motor driving the massage head to do linear reciprocating motion, thereby providing stimulation to a sensitive area of the human body, such as the clitoris, the vagina and the like. However, such sex toy stimulates the human body has a limited stimulation range and unsatisfactory stimulation effect.

SUMMARY

An object of this application is to provide a massage device, which has an enlarged stimulation range and better stimulation effect.

To achieve the above object, this application provides a massage device that includes:

a shell defining a chamber and a moving space therein, the moving space communicating with an external environment out of the shell;

a driving assembly supported by the shell, the driving assembly including a driving wheel and a driven wheel cooperating with the driving wheel, one of the driving wheel and driven wheel being accommodated inside the chamber and another one of the driving wheel and driven wheel being accommodated inside the moving space; and a massage member mounted around the driving wheel and driven wheel, wherein the massage member partly extends into the moving space and partly surrounds an outer surface of the shell adjacent to the moving space.

Compared with the existing massage devices, the massage device according to the embodiments of the present application generates a kneading effect on the human body through the rotation of the massage member and has an enlarged stimulation range and better stimulation effect. Thus, the users are more likely to reach orgasm with the help of the present massage device.

BRIEF DESCRIPTION OF THE DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF THE EMBODIMENTS

Figure 1:
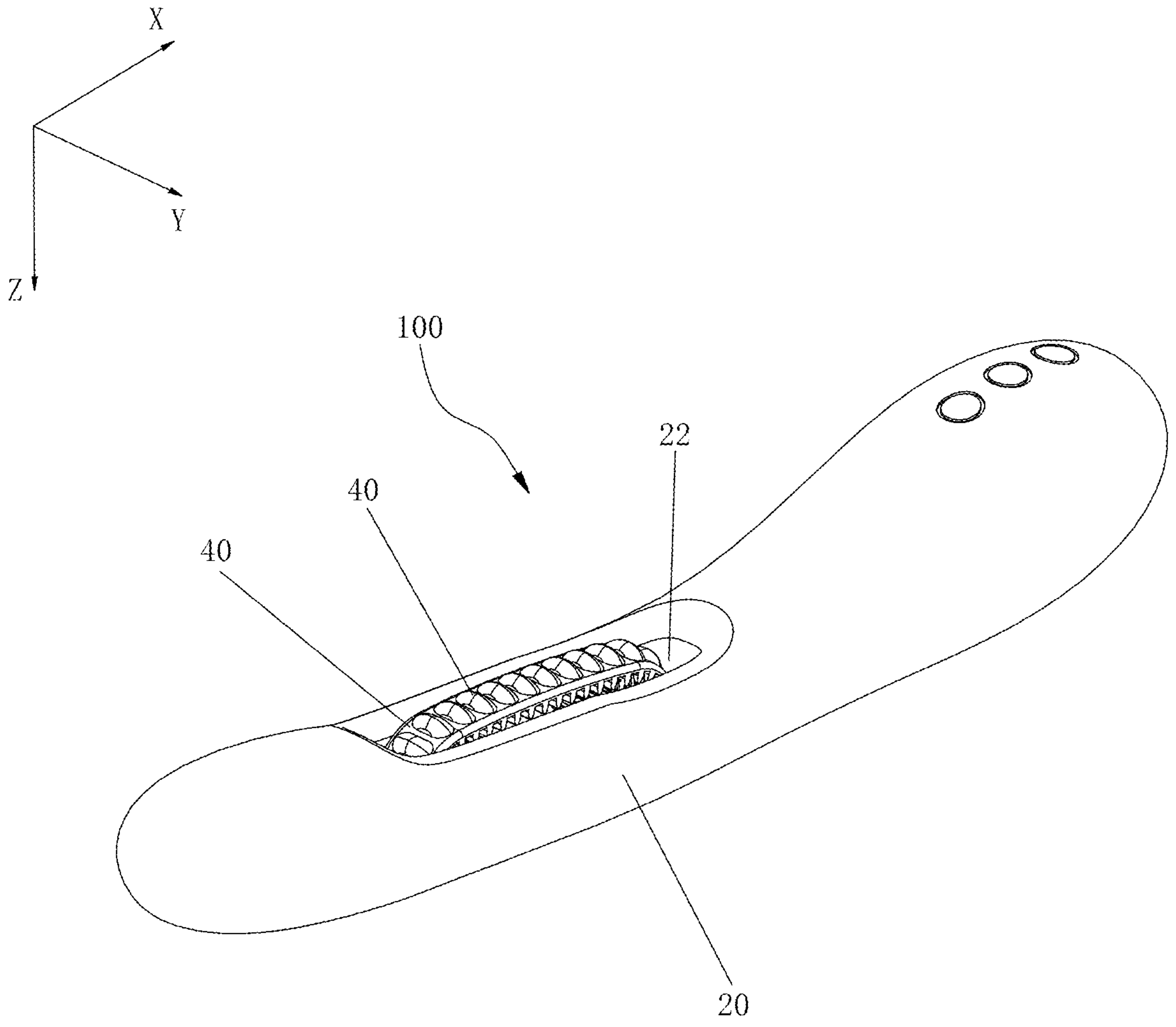
FIG. 1 is a schematic, assembled view of a massage device according to a first embodiment of the present application.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIGS. 1-5, a massage device 100 according to an embodiment of the present application includes a shell 20, a driving assembly 30 supported by the shell 20, and a massage member 40 connected to the driving assembly 30 in a transmission way. During use, a front portion of the shell 20 may be inserted into a human body, particularly a rectum or a vagina of the human body. In this embodiment, a vibration motor 50 is set inside the front portion of the shell 20, which generates a stimulation effect on a clitoris or a prostate of the human body through vibration.

In this embodiment, the shell 20 in whole is elongated and generally rod-shaped. A moving space 22 is defined in a middle portion of the shell 20 along its longitudinal direction (i.e., X-direction). The massage member 40 at least partly extends into the moving space 22 of the shell 20, and is driven to rotate in the moving space 22 under the action of the driving assembly 30. The rotating massage member 40 generates a kneading stimulation effect on a vaginal wall or a rectal wall of the human body, further stimulating the clitoris or the prostate, making it easier for the users to reach orgasm, thereby obtaining a more comfortable sexual experience.

Figure 3:
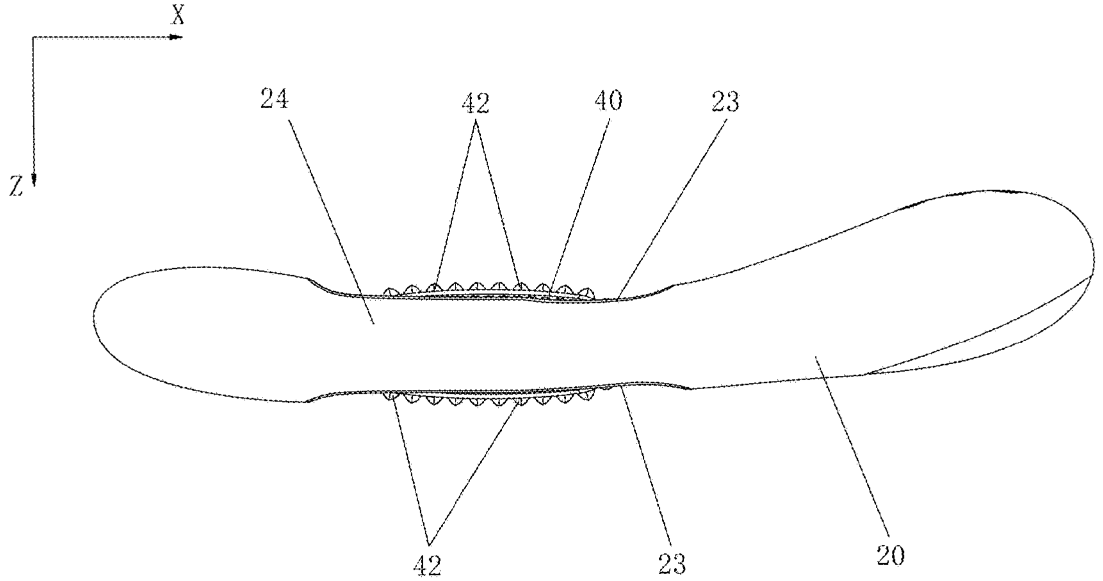
FIG. 3 is a side view of the massage device of FIG. 1.
Figure 4:
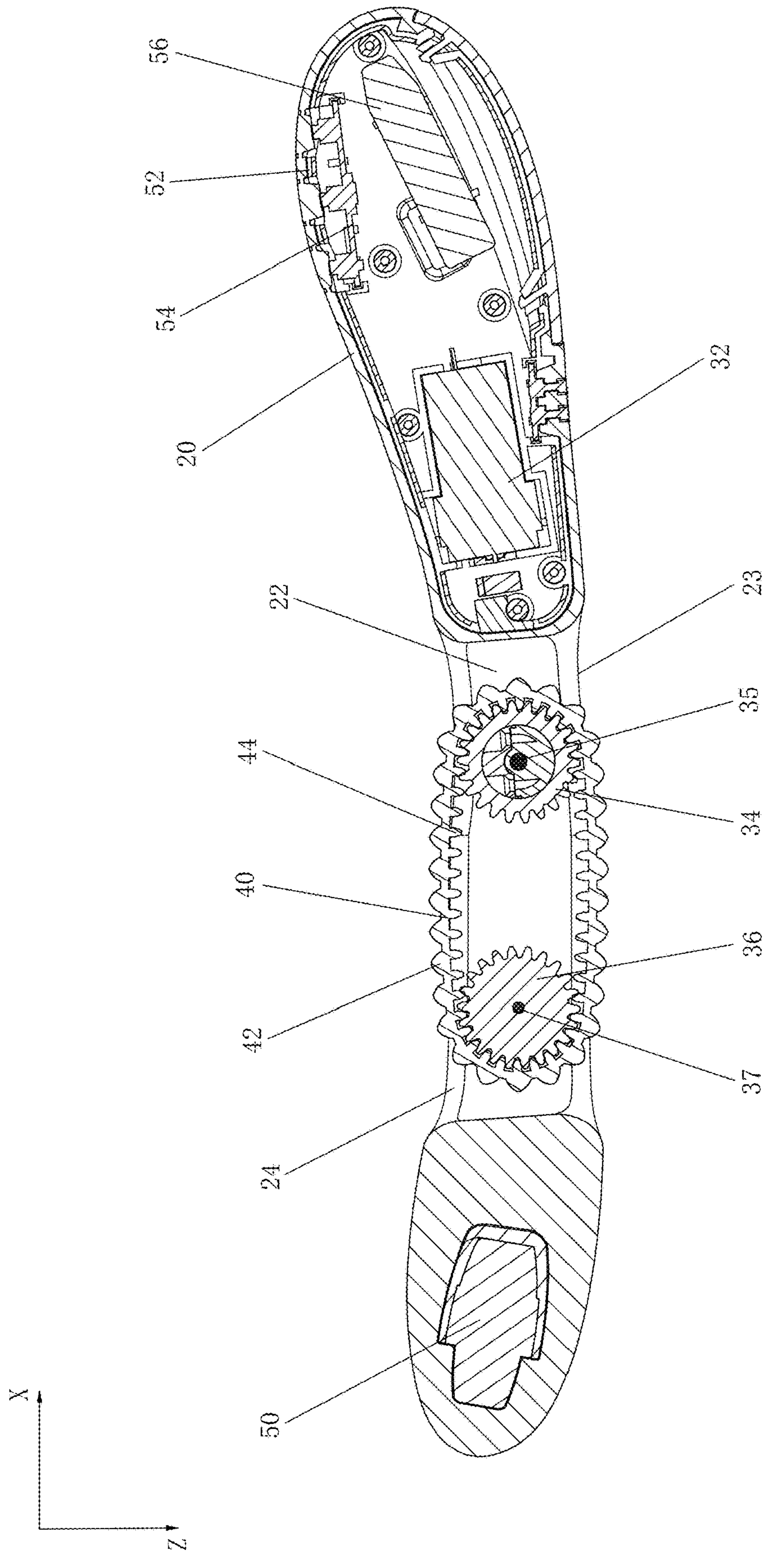
FIG. 4 is a cross sectional view of the massage device taken along line IV-IV of FIG. 2.

In this embodiment, as shown in FIG. 3 and FIG. 4, the moving space 22 extends through two opposite sides of the shell 20, such as, extends along Z-direction through top and bottom sides of the shell 20. That is, in the Z-direction, a depth of the moving space 22 is substantially equal to a thickness of the shell 20. Two openings 23 are defined at top and bottom sides of a lateral wall of the shell 20, respectively. The moving space 22 communicates with an external environment out of the shell 20 through the openings 23, and the massage member 40 may extend into the external environment via the opening 23 to directly contact the vaginal wall or rectal wall.

In this embodiment, a size of the whole massage member 40 in the Z-direction is greater than a depth of the moving space 22 in the Z-direction, top and bottom portions of the massage member 40 extend beyond the moving space 22 of the shell 20 into the upper and lower sides of the shell 20 through the openings 23, respectively. Thus, the massage member 40 can simultaneously come into contact with portions of the rectum wall/vaginal wall located at its upper and lower sides, which increases a stimulated area of the massage member 40 of the present massage device 100 on the human body.

Figure 5:
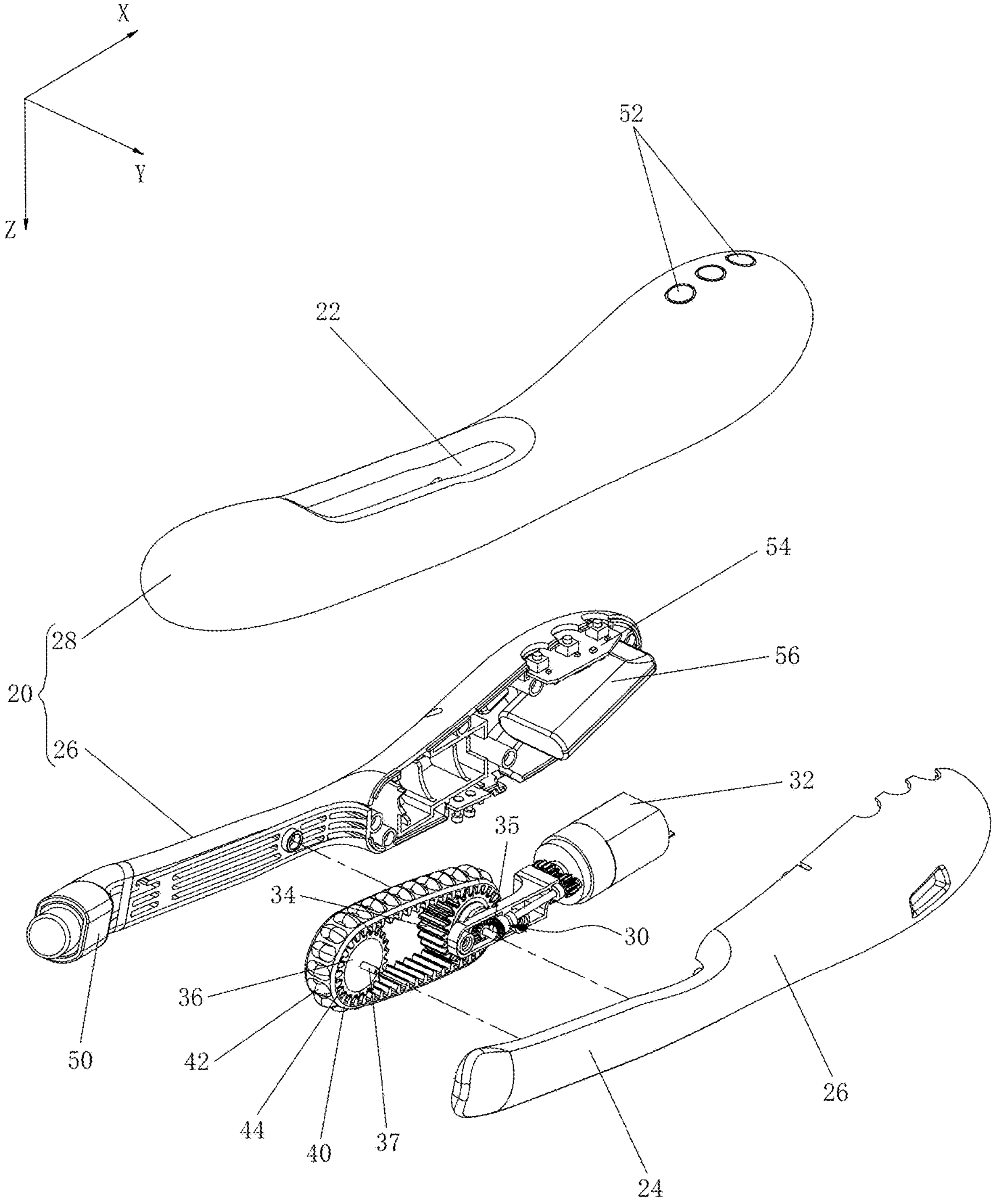
FIG. 5 a schematic, exploded view of the massage device of FIG. 1.
Figure 6:
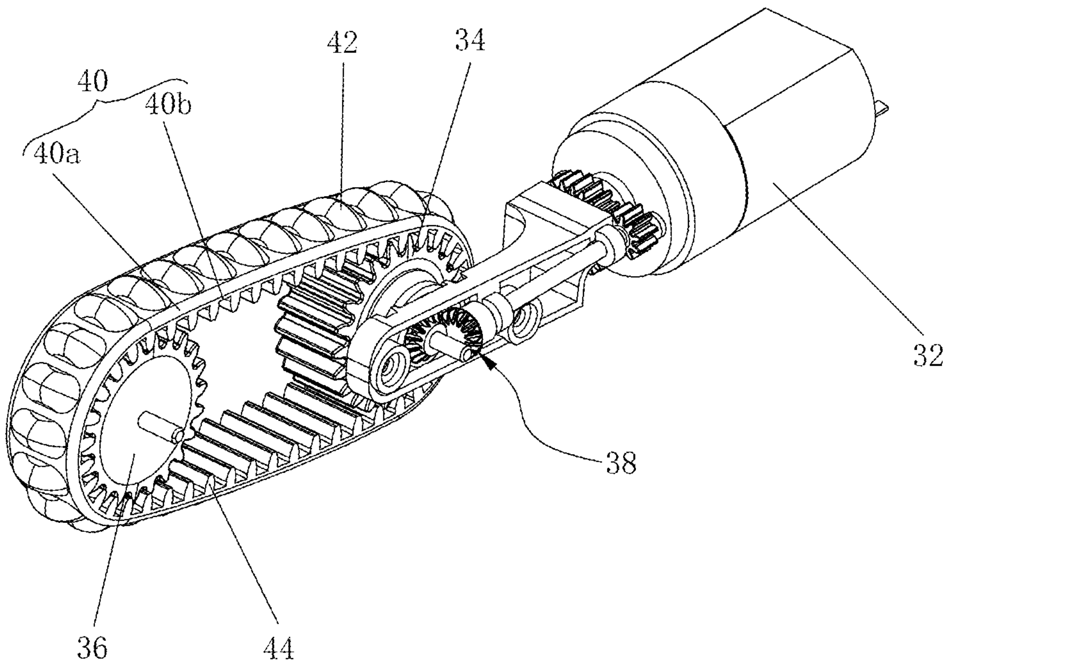
FIG. 6 is a schematic view of a massage member and a driving assembly of the massage device.
Figure 7:
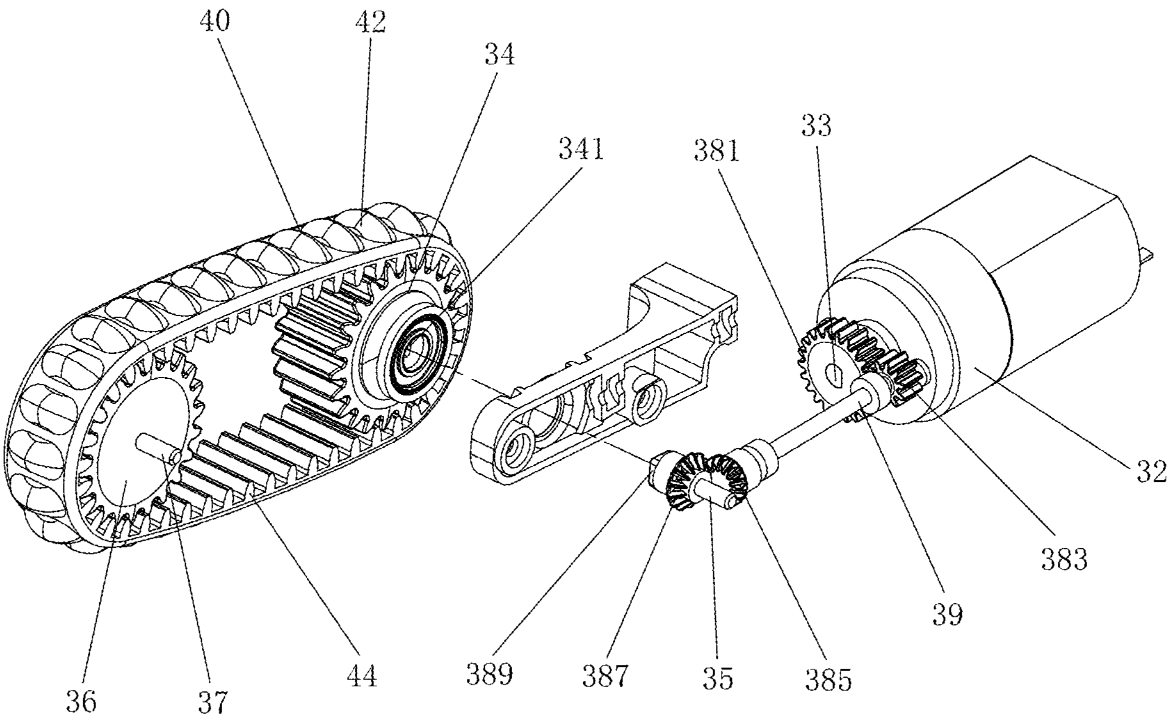
FIG. 7 is a further exploded view of FIG. 5.

As shown in FIGS. 5-7, the massage member 40 is shaped like an annular belt, and specifically, shaped like an elliptical caterpillar belt. An outer circumferential surface of the massage member 40 is provided with a plurality of protrusions 42, which extend outwardly from the moving space 22 of the shell 20 to contact the rectum wall/vaginal wall directly, further improving the stimulation effect on the rectum wall or the vaginal wall. The protrusions 42 may be convex points, convex pillars, convex strips, convex ribs, etc., distributed at intervals along a circumferential direction of the massage member 40. In this embodiment, the protrusions 42 are shaped as elongate convex ribs.

Figure 8:
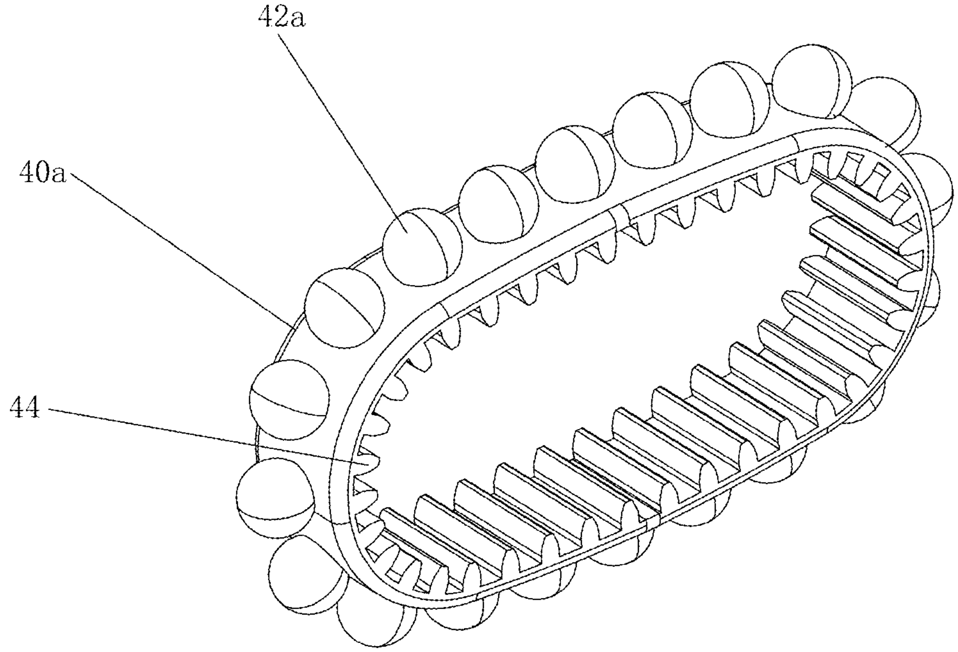
FIG. 8 is a first alternative of the massage member.
Figure 9:
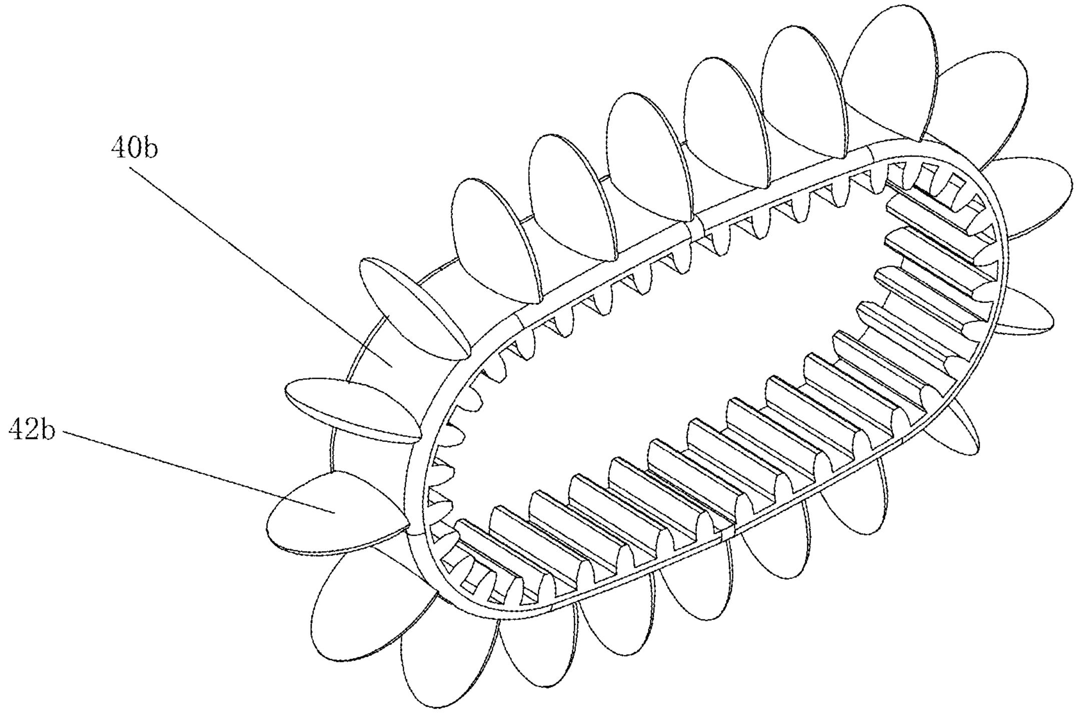
FIG. 9 is a second alternative of the massage member.
Figure 10:
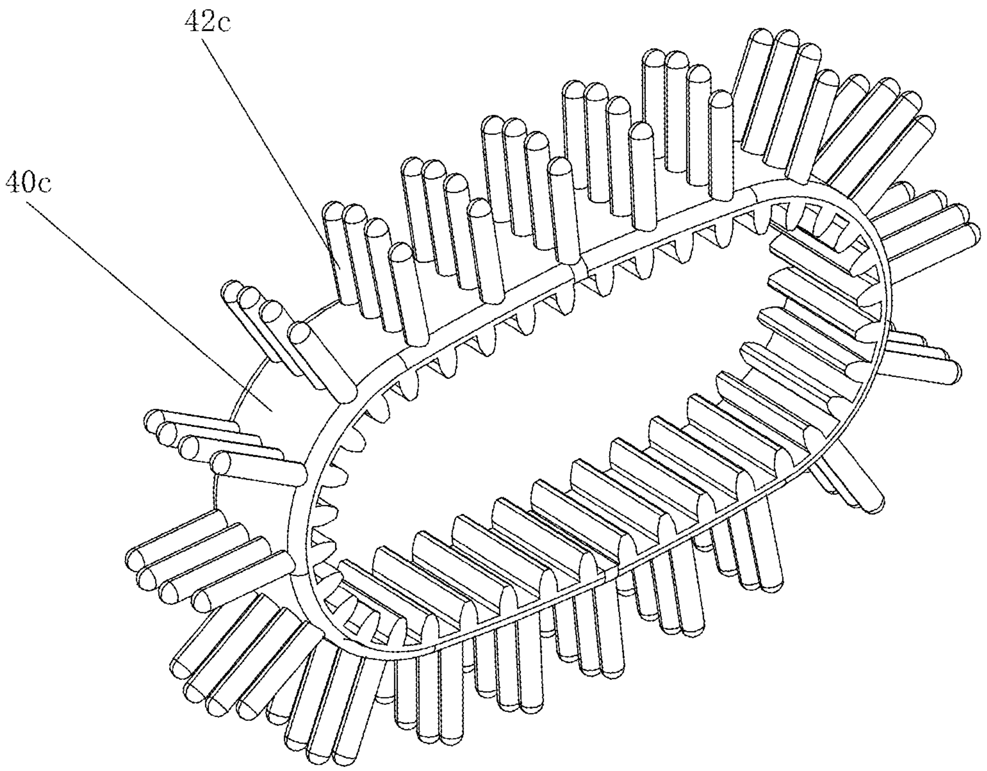
FIG. 10 is a third alternative of the massage member.

FIGS. 8-10 show alternative embodiments of the massage member. As shown in FIG. 8, the massage member 40*a* has a plurality of protrusions 42*a* shaped like balls provided on its outer circumferential surface. As shown in FIG. 9, the protrusions 42*b* of the massage member 40*b* are shaped like arc sheets. As shown in FIG. 10, the protrusions 42*c* of the massage member 40*c* are shaped like pillars. It should be noted that the protrusions are designed for enhancing the stimulation effect, and may be modified according to needs and should be limited to the specific embodiments.

Figure 11:
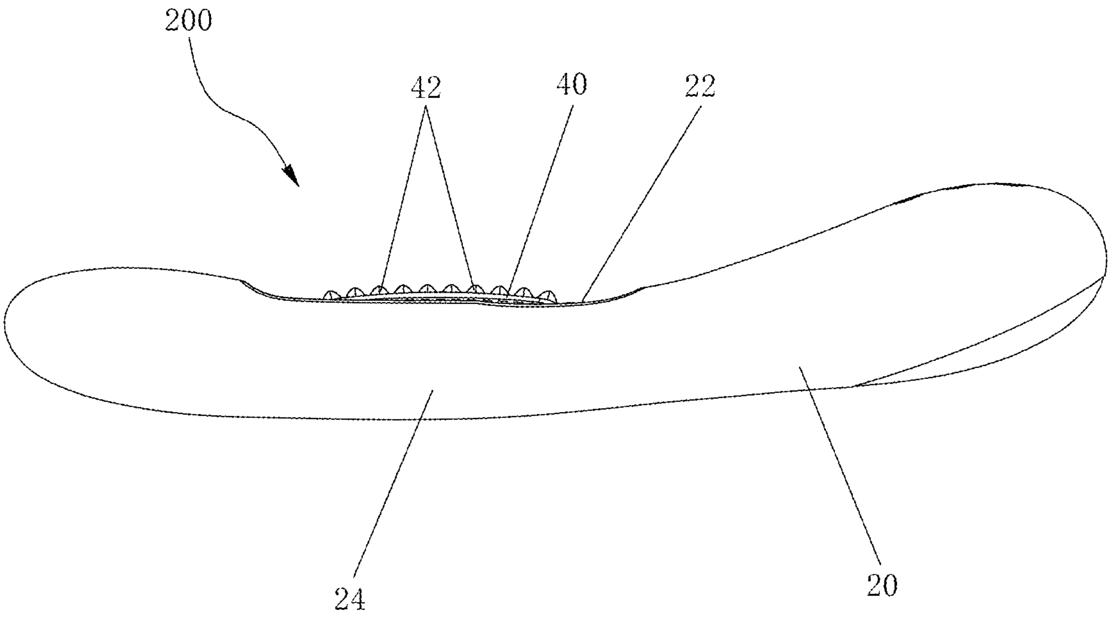
FIG. 11 is a schematic view of a massage device according to a second embodiment of the present application.

In addition, the depth of the moving space 22 may be less than the thickness of the shell 20 in the Z-direction. In this case, the moving space 22 may only penetrate one of the top and bottom sides of the shell 20. For example, as shown in FIG. 11, the massage device 200 has a moving space 22 only penetrating the top side of the lateral wall of the shell 20, so that only the top portion of the massage member 40 extends into the external environment over the shell 20. During in use, the massage member 40 is driven to rotate, kneading a portion of the rectum wall or the vaginal wall nestled to the open side of the moving space 22.

As shown in FIGS. 5-7, the driving assembly 30 includes a driving motor 32, a driving wheel 34 connected to the driving motor 32, and a driven wheel 36 that cooperates with the driving wheel 34. As shown in FIG. 4, the driving motor 32 is set in a rear portion of the shell 20, while the driving wheel 34 and the driven wheel 36 both are received in the moving space 22. The massage member 40 is mounted around and engaged with the driving wheel 34 and the driven wheel 36. During use, the driving motor 32 drives the massage member 40 to rotate in the moving space 22 through the driving wheel 34 and the driven wheel 36.

Figure 2:
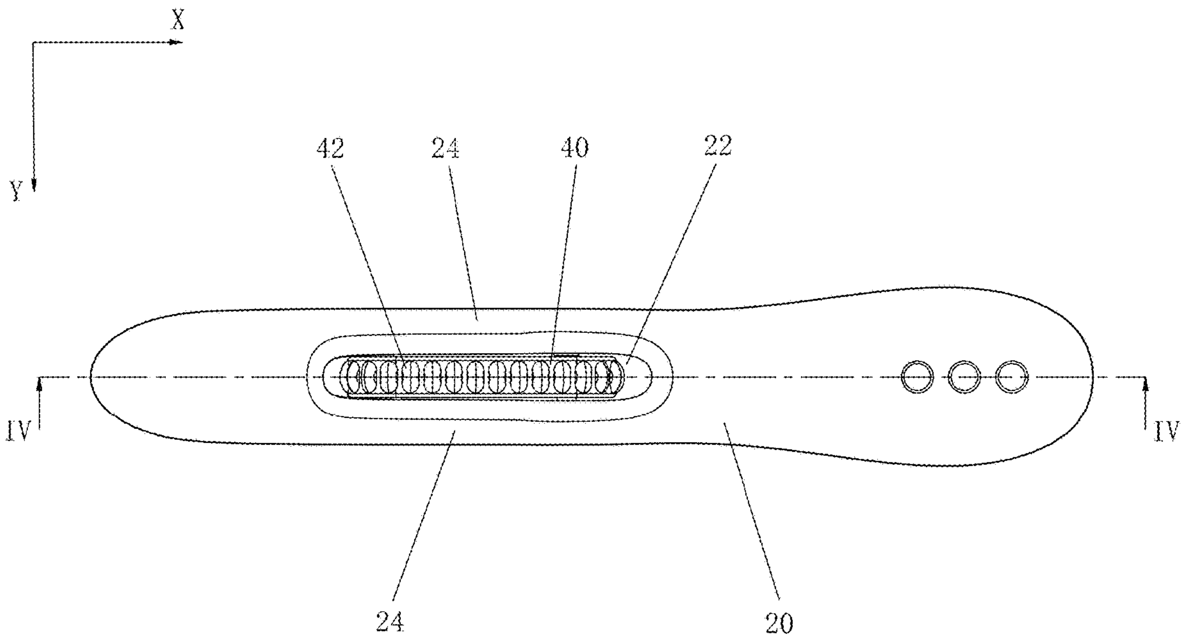
FIG. 2 is a top plan view of the massage device of FIG. 1.

As shown in FIG. 2 and FIG. 5, the moving space 22 is generally closed in its circumferential direction, and the shell 20 forms two support arms 24 at left and right sides, of the moving space 22, respectively. The driving wheel 34 and the driven wheel 36 are arranged side by side in the X-direction, wherein the driving wheel 34 is set adjacent to a rear end of the moving space 22, and is pivotally connected to the support arms 24 by a first shaft 35; and, the driven wheel 36 is set adjacent to a front end of the moving space 22, and is pivotally connected to the support arms 24 by a second shaft 37.

In this embodiment, the first shaft 35 and the second shaft 37 both extend laterally, such as along Y-direction. The first shaft 35 may be formed separately and then connected to the shell 20 and the driving wheel 34. The second shaft 37 may be formed separately and then connected to the shell 20 and the driven wheel 36. Alternatively, the first shaft 35 may be integrally formed with the shell 20 or the driving wheel 34; and/or, the second shaft 37 may be integrally formed with the shell 20 or the driven wheel 36.

In this embodiment, the driving wheel 34 and the driven wheel 36 both are gears, and an inner circumferential surface of the massage member 40 has a plurality of teeth 44 provided thereon, which are evenly spaced along the circumferential direction of the massage member 40 and mesh with the driving wheel 34 and the driven wheel 36. In this way, when the driving motor 32 drives the driving wheel 34 to rotate, the driving wheel 34 drives the massage member 40 engaged with it to rotate, and the massage member 40 drives the driven wheel 36 engaged with it to rotate, so that the massage member 40 can rotate continuously.

A transmission unit, such as a gear unit 38, is provided between the driving motor 32 and the driving wheel 34. As a transmission mechanism, the gear unit 38 can not only transmit the torque from the driving motor 32 to the driving wheel 34, but also change the direction of torque transmission as needed. In a specific embodiment, as shown in FIGS. 6-7, the gear unit 38 includes a first gear 381, a second gear 383, a third gear 385, and a fourth gear 387.

Among them, the first gear 381 is mounted around a shaft 33 of the driving motor 32, and the two are preferably arranged coaxially; the second gear 383 meshes with the first gear 381, preferably with a diameter smaller than that of the first gear 381; the third gear 385 and the second gear 383 are arranged coaxially, and the two can be connected integrally; the fourth gear 387 meshes with the third gear 385, preferably the third gear 385 and the fourth gear 387 both are bevel gears. The driving wheel 34 is coaxial with the fourth gear 387, wherein the diameter of the driving wheel 34 is greater than the diameter of the fourth gear 387.

By matching of the two bevel gears 385 and 387, a 90-degree change in the direction of torque transmission can be achieved, and thus the axial direction of the driving wheel 34 may be perpendicular to the shaft 33 of the driving motor 32. Through the gear unit 38, the torque transmission direction can be changed and long-distance deceleration torque transmission can be achieved.

After the high-speed rotation of the driving motor 32 is decelerated step by step, the driving wheel 34 is driven to rotate at an appropriate speed, thereby driving the massage member 40 to rotate at an appropriate speed. In the illustrated embodiment, the driving motor 32, the first gear 381, and the second gear 383 are set inside the rear portion of the shell 20, and the third gear 385 and the fourth gear 387 are accommodated in one of the support arms 24 of the shell 20. The third gear 385 is connected to the second gear 383 through an elongated rod 39, allowing the driving wheel 34 to be arranged in the moving space 22.

In this embodiment, a non-circular shaped, such as square-shaped, connecting hole 341 is defined in the center of the driving wheel 34, and the fourth gear 387 extends outward to form a connecting portion 389. The connecting portion 389 is inserted into the connecting hole 341 and fixed in a circumferential direction through shape matching. In this way, the fourth gear 387 can drive the driving wheel 34 to rotate synchronously. It should be understood that the fourth gear 387 may be assembled to the driving wheel 34 in other ways, as long as it can drive the driving wheel 34 to rotate.

It should be understood that the quantity, structure, size, etc. of the gears in the gear unit 38 may be adjusted as needed. In addition, other transmission mechanisms, such as worm gears, pulleys, etc., or a combination of multiple transmission mechanisms may be provided between the driving motor 32 and the driving wheel 34. That is, the transmission mechanism between the driving motor 32 and the driving wheel 34 is not limited to the gear transmission shown in the drawings. Furthermore, in some embodiments, the driving motor 32 may drive the driving wheel 34 to rotate directly, omitting the transmission mechanism.

In this embodiment, the rear portion of the shell 20 is configured as a handle of the massage device 100, and function buttons 52 are provided on an outer wall of the handle. In the handle, a control circuit board 54 is provided, which connects electrically to the vibration motor 50, the driving motor 32, the buttons 52 and other electronic components to form a control circuit. The users may control the operation of the present massage device, such as control the direction and speed of the driving motor 32, control the vibration frequency of the vibration motor 50 inside the front portion of the shell 20, and etc. through the buttons 52 on the handle of the shell 20.

Further, a battery 56, which is preferably a rechargeable battery, is provided inside the handle of the shell 20. The battery 56 is electrically connected to the control circuit board 54 serves as the power source for the whole massage device 100.

During use, the users may start only the drive motor 32 or the vibration motor 50, or start both the drive motor 32 and the vibration motor 50 simultaneously, so that the users can experience different stimulation effects according to actual needs. Compared with the existing massage devices, the massage device according to the embodiments of the present application generates a kneading effect on the human body through the rotation of the massage member, which has an enlarged stimulation range and better stimulation effect. Thus, the users are more likely to reach orgasm with the help of the present massage device.

In a specific embodiment, the shell 20 is a double-layer structure, including an inner shell 26 and an outer shell 28 that covers the inner shell 26. The inner shell 26 may be made of hard materials, such as plastic, alloy and the like. A space for installing the driving assembly 30, the control circuit board 54, the battery 56, and etc. is defined inside the inner shell 26. The outer shell 28, which is the outermost layer of the entire massage device 100, may be made of soft materials, such as silicone, rubber and the like, providing a soft touch when it is inserted into the human body.

During production, firstly, the driving motor 32, the vibration motor 50, the control circuit board 54, the battery 56, and etc. may be assembled within the inner shell 26, and then together placed into a mold to form the outer shell 28 through over-molding. The outer shell 28 integrally formed on the inner shell 26 not only simplifies production and assembly, but also improves the overall sealing performance of the massage device 100. In addition, the integral outer shell 28 plays a waterproof and dustproof role, facilitating the cleaning and storage of the present massage device 100.

The massage member 40, as a component that directly interacts with the human body, can be made of soft materials such as silicone and rubber, providing a soft touch when in contact with the human body.

In a specific embodiment, the massage member 40 may be a double-layer structure, including an inner belt **40*a* and an outer belt 40*b* around the inner belt 40*a*. The outer belt 40*b* may be made of soft materials such as silicone and rubber, and the inner belt 40*a* may be made of hard materials such as plastic and alloy. The teeth 44 extend inwardly and integrally from an inner circumferential surface of the inner belt 40*a*, so that they have sufficient strength to form effective torque transmission with the driving wheel 34. The protrusions 42 extend outwardly and integrally from an outer circumferential surface of the outer belt 40*b***, allowing them to directly contact and avoiding unnecessary damage to the human body.

Figure 12:
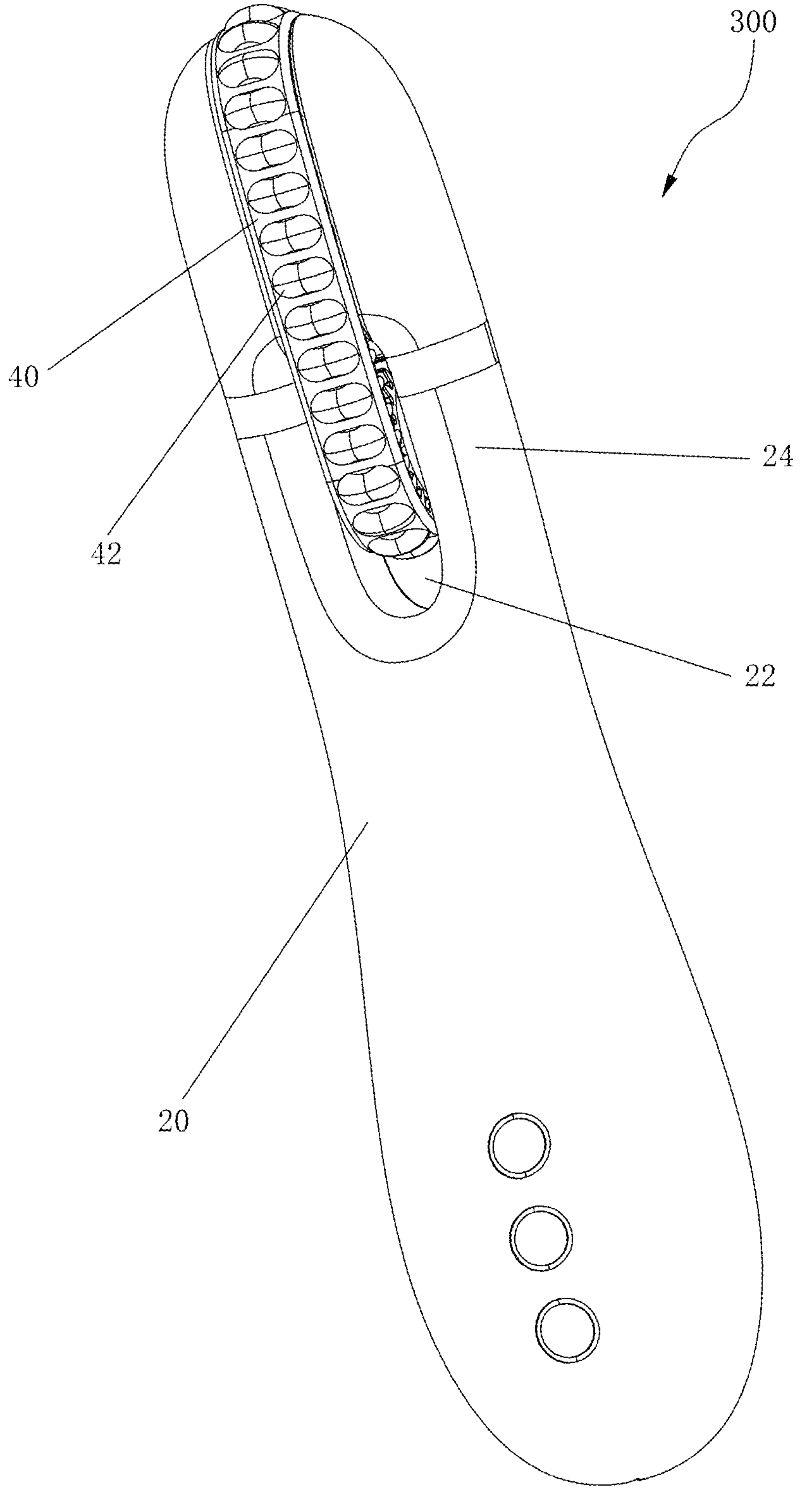
FIG. 12 is a schematic view of a massage device according to a third embodiment of the present application.
Figure 13:
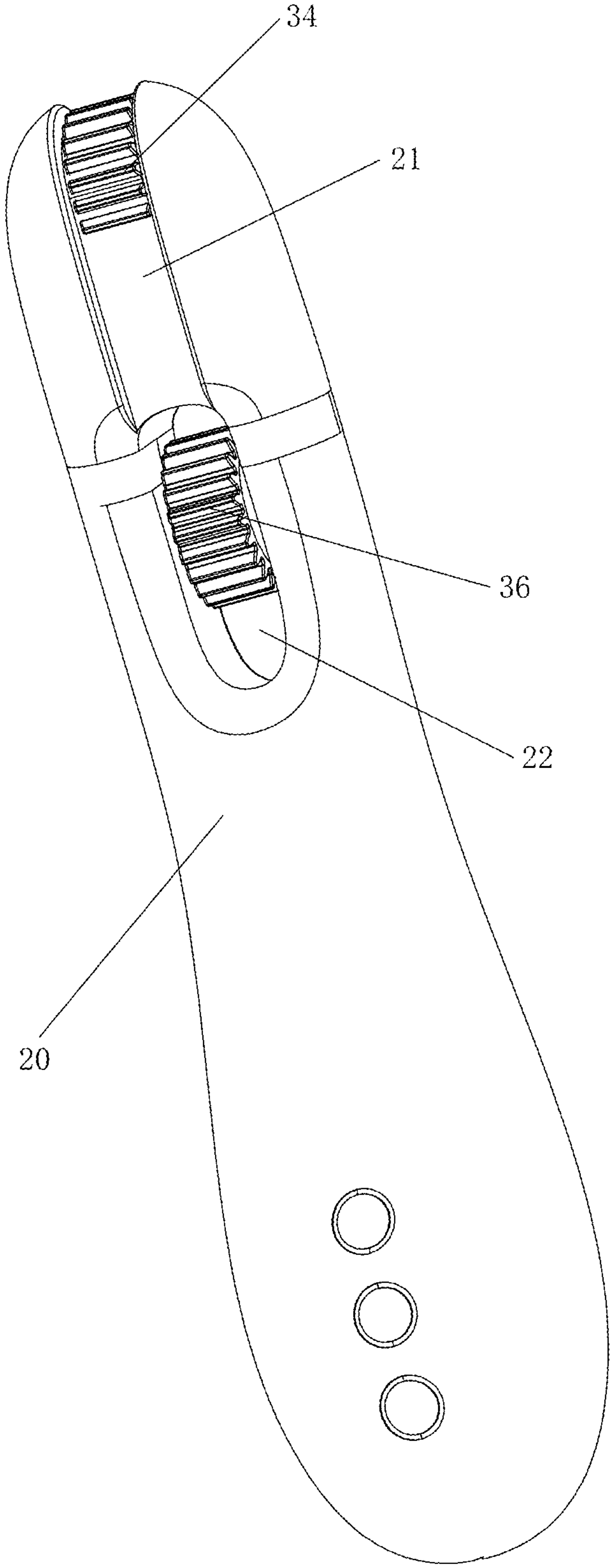
FIG. 13 is similar to FIG. 12, wherein the massage member is removed.

As shown in FIGS. 12-13, a massage device 300 according to an alternative embodiment of the present application is shown. The massage device 300 of this embodiment is similar to the previous embodiments, and similarities between these embodiments will no longer be repeated here.

In this embodiment, the massage member 40 may be partially received in the moving space 22 of the shell 20, and partially mounted around the front portion of the shell 20, wherein the front portion of the shell 20 is at a front side of the moving space 22 and configured to be inserted into the rectum or the vagina of the human body. In this case, the driving wheel 34 is mounted inside the front portion of the shell 20, and the driven wheel 36 is accommodated inside the moving space 22 of the shell 20. In this way, stimulation to the deep in the vagina or the deep in the rectum may be enhanced.

Referring to FIG. 13, a groove 21 is defined in an outer wall surface of the front portion of the shell 20 to provide an installation space and a rotation path for the massage member 40. The groove 21 has a shape similar to the massage member 40, being annular and elliptical. A depth of the groove 21 relative to the outer wall surface of the shell 20 is less than the thickness of the massage member 40. After assembly, part of the massage member 40, such as the inner belt is received in the groove 21, while the other part, such as the outer belt protrudes to a certain height relative to the outer wall surface of the shell 20 to contact the vaginal wall or the rectal wall directly.

Preferably, the outer circumferential surface of the massage member 40 is provided with a plurality of protrusions 42. The protrusions 42 protrude outwardly relative to the outer wall surface of the front portion of the shell 20. Specifically, the protrusions 42 may be convex points, convex pillars, convex strips, convex ribs, etc., distributed at intervals along the circumferential direction of the massage member 40. When the massage member 40 rotates around the front portion of the shell 20 to stimulate the vaginal wall or the rectum wall of the human body, the protrusions 42 can further improve the stimulation effect to the prostate or the clitoris.

Figure 14:
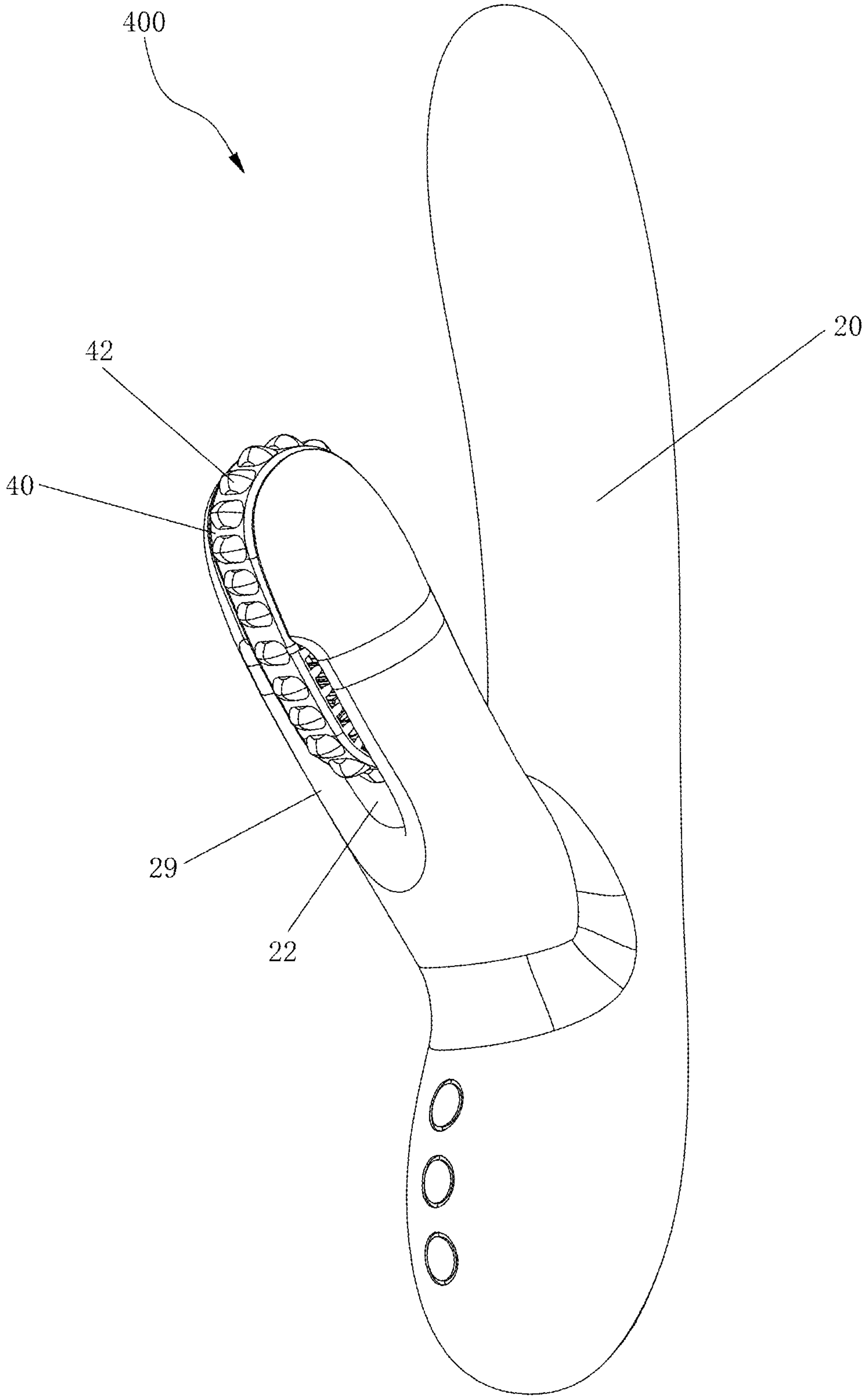
FIG. 14 is a schematic view of a massage device according to a fourth embodiment of the present application.
Figure 15:
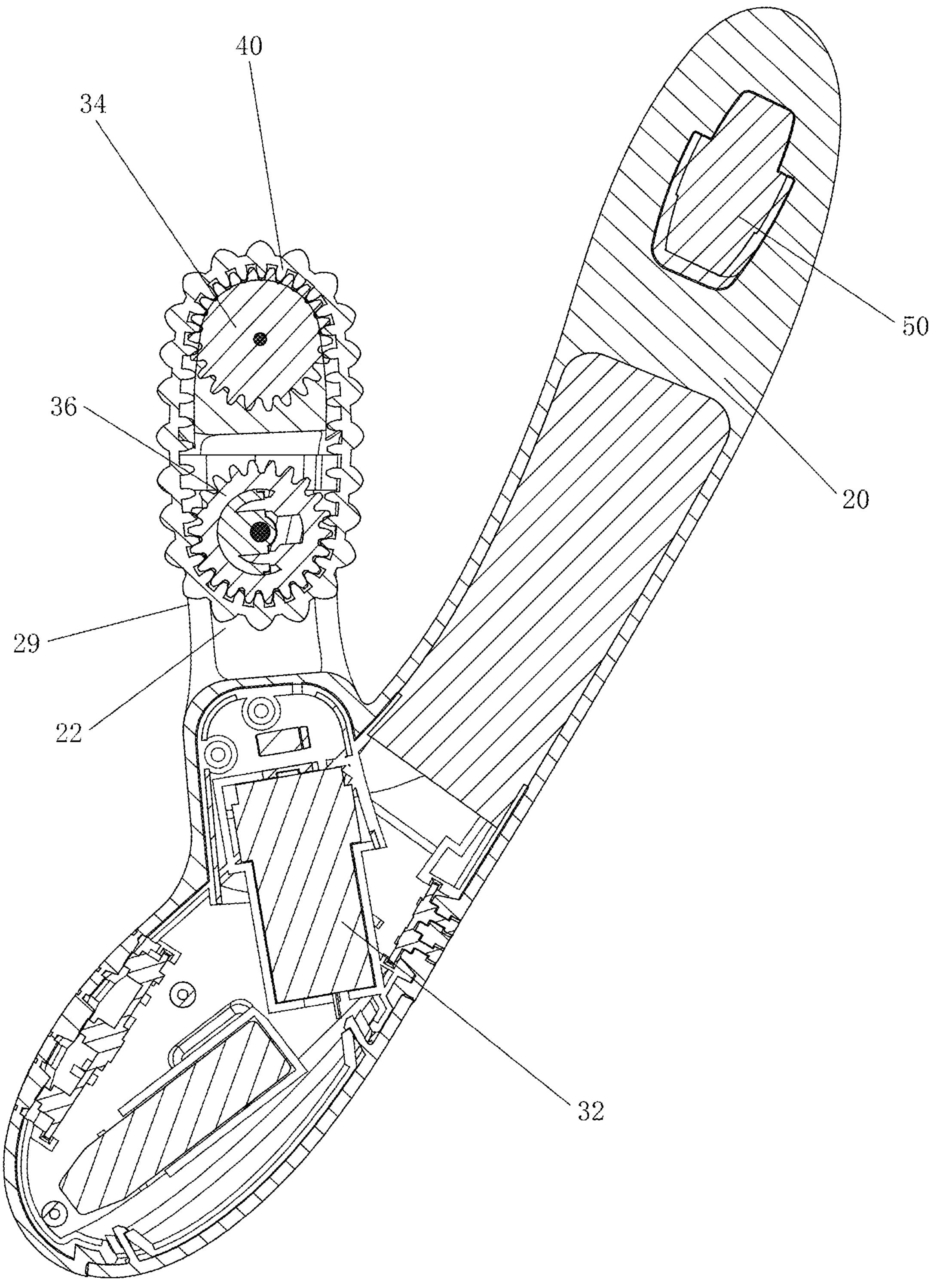
FIG. 15 is a cross section view of the massage device of FIG. 14.

As shown in FIGS. 14-15, a massage device 400 according to another alternative embodiment of the present application is shown. Similarly, the shell 20 of the massage device 400 is elongated and generally rod-shaped, wherein a front portion of the shell 20 is configured to be inserted into the vaginal or the rectum of the human body during use, and a rear portion of the shell 20 serves as a handle for holding and operation of the massage device 300. Preferably, a vibration motor 50 is set inside the front portion of the shell 20 for driving the front portion of the shell 20 to stimulate the vaginal wall or the rectum wall through vibration.

Differently, a branch 29 extends upwards and forwards from the rear portion of the shell 20 towards an upper side of a middle portion of the shell 20. When the front portion of the shell 20 is inserted into the vaginal, the branch 20 is located out of the human body and acts on the vulva. The moving space 22 is defined in the branch 29 and communicates with the external environment out of the branch 29. The massage member 40 is partly mounted around a distal end of the branch 29 of the shell 20 and partly extends into the moving space 22 of the branch 29.

The driving member 30 is supported by the branch 29 of the shell 20, and includes a driving motor 32, a driving wheel 34 connected to the driving motor 32, and a driven wheel 36 cooperating with the driving wheel 34. The driving wheel 34 is mounted inside the branch 29, and the driven wheel 36 is accommodated inside the moving space 22 of the branch 29. The massage member 40 is mounted around and engaged with the driven wheel 36 and driving wheel 34. Thereby, the driving motor 32 can drive the massage member 40 to rotate, stimulating the vulva, particularly a clitoris of the human body.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A massage device comprising:

a shell comprising a rod-shaped body configured to be inserted into a vagina or a rectum of a human body and a branch extending obliquely away from the rod-shaped body;

a moving space extending through a lateral wall of the rod-shaped body or the branch to define two openings in two opposite sides of the lateral wall of the rod-shaped body or the branch, respectively, the moving space communicating with an external environment out of the lateral wall of the rod-shaped body or the branch through the two openings;

a driving assembly supported by the shell, the driving assembly comprising a driving wheel and a driven wheel cooperating with the driving wheel, one of the driving wheel and the driven wheel being accommodated inside an inner chamber of the lateral wall of the rod-shaped body or the branch, and another one of the driving wheel and the driven wheel being accommodated inside the moving space; and a massage member mounted around the driving wheel and the driven wheel, wherein the massage member partly extends into the moving space and spaced from the lateral wall of the rod-shaped body or the branch, and partly surrounds an end portion of the rod-shaped rod or the branch adjacent to the moving space.

2. The massage device according to claim 1, wherein the driving wheel is accommodated inside the inner chamber of the lateral wall of the rod-shaped body or the branch, and the driven wheel is accommodated inside the moving space.

3. The massage device according to claim 1, wherein the rod-shaped body is elongated and comprises a front end portion, a rear end portion and a middle portion connected between the front end portion and the rear end portion, and the moving space is defined in the middle portion of the rod-shaped body.

4. The massage device according to claim 3, wherein a vibration motor is set inside the front end portion, and the massage member partly surrounds the front end portion of the rod-shaped body.

5. The massage device according to claim 1, wherein the rod-shaped body comprises a front end portion configured with a vibration motor and a rear end portion configured as a handle, the branch extends upward and frontward from the rear end portion of the rod-shaped body towards an upper side of the rod-shaped body, and the moving space is defined in a middle portion of the branch.

6. The massage device according to claim 5, wherein the massage member partly surrounds an outer surface of a distal end portion of the branch and is configured for stimulating a clitoris of the human body.

7. The massage device according to claim 1, wherein an annular groove is concaved inwardly from an outer surface of the end portion of the rod-shaped rod or the branch adjacent to the moving space for mounting the massage member.

8. The massage device according to claim 7, wherein the massage member comprises an annular body and a plurality of protrusions formed on an outer wall of the annular body, the annular body is accommodated inside the annular groove, and at least one of the plurality of protrusions protrudes outwardly relative to the outer surface of the end portion.

9. The massage device according to claim 8, wherein the annular body comprises an annular inner belt and an annular outer belt being integrally from with the inner belt and set around the inner belt, and the outer belt has a hardness less than that of the inner belt; and wherein the plurality of protrusions are formed on an outer circumferential surface of the outer belt.

10. The massage device according to claim 9, wherein a plurality of teeth is formed on an inner circumferential surface of the inner belt and engaged with the driving wheel and driven wheel.

11. The massage device according to claim 10, wherein the one of the driving wheel and the driven wheel partly extends through the end portion into the annular groove to engage with the teeth.

12. The massage device according to claim 8, wherein the protrusions are configured as convex ribs, balls, arc sheets or pillars.

13. The massage device according to claim 8, wherein at least one of the plurality of protrusions is fully accommodated inside the moving space.

14. The massage device according to claim 1, wherein the moving space extends through a top side and a bottom side of the lateral wall of the rod-shaped body or the branch, and a top portion and a bottom portion of the massage member extend out of the moving space into the external environment through the two openings, respectively.

15. The massage device of claim 1, wherein the driving assembly further comprises a driving motor and a gear unit provided between the driving motor and the driving wheel, and the gear unit comprises at least two bevel gears meshing with each other.

16. The massage device of claim 1, wherein the massage member comprises an annular body mounted around the driving wheel and the driven wheel, and a plurality of protrusions extending outeardly from an outer wall of the annular body; and wherein the plurality of protrusions comprise a first protrusion configured to be partly positioned in the external environment through one of the two openings, a second protrusion configured to be within the moving space, and a third protrusion configured to be partly positioned in the external environment through another one of the two openings.

* * * * *